May 14, 1968     W. A. FYFE ET AL     3,382,533

APPARATUS FOR APPLYING SLEEVES TO OBJECTS

Filed April 25, 1966     5 Sheets-Sheet 1

FIG. I

INVENTORS
W. A. FYFE
R. W. SHORE
N. F. SMITH
By A. J. Nugent
ATTORNEY

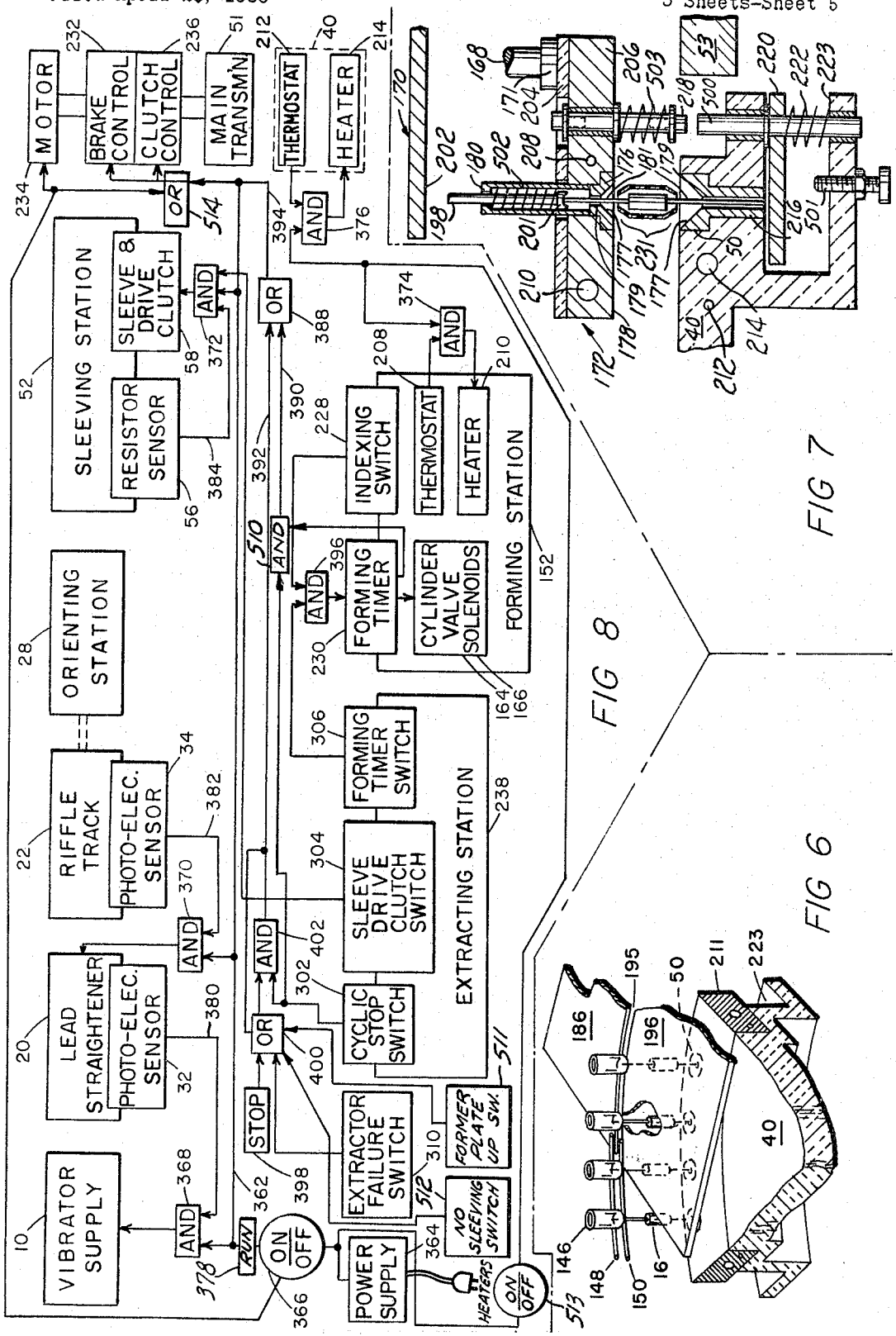

United States Patent Office 3,382,533
Patented May 14, 1968

3,382,533
APPARATUS FOR APPLYING SLEEVES TO OBJECTS
William A. Fyfe, North Reading, Alfred W. Shore, Amesbury, and Norman F. Smith, Methuen, Mass., assignors to Western Electric Company, Incorporated, New York, N.Y., a corporation of New York
Filed Apr. 25, 1966, Ser. No. 544,780
18 Claims. (Cl. 18—5)

ABSTRACT OF THE DISCLOSURE

The disclosure concerns apparatus for automatically cutting, assembling, and die forming plastic sleeves to resistors. The resistors are fed to individual conical-shaped forming dies spaced about an indexing table. Sleeving is cut from a tube of plastic material and provisionally mounted over individual ones of the resistors. The preassembled resistor units are supported and guided by the apparatus in a manner to avoid premature heating by the indexing table. The preassembled units are fed to a forming station also having individual conical dies. As the forming station dies operatively close over the indexing table dies, the preassembled units are properly positioned in the dies, and the sleeves are conformed and molded about their respective resistors. The table then advances the sleeved resistors to an extractor station for removal from the apparatus. The apparatus also includes a combination of drive, clutch, and transmission means and an electrical control circuit for regulating, in timed sequence, the various station operations of the apparatus.

---

This invention relates, in general, to apparatus for automatically applying sleeves to articles and more particularly to apparatus for applying sleeves to resistors.

Sleeving resistors has been a slow and tedious job which for the most part has been performed by hand. In practice, heretofore, pre-cut thermoplastic sleeves were preformed at one end. Heat and pressure manually applied to the unformed end of the sleeve after the worker had placed it on the resistor completed the forming operation. Automatic forming machines have been employed, but they required the use of pre-cut sleeves. Some such machines operate by applying heat and pressure to the open end of pre-cut, pre-formed sleeves as the resistor is rolled about its longitudinal axis. This can result in a flat spot in the area where the rolling operation begins and such a spot can weaken the sleeve and make it unattractive.

Accordingly, an object of the invention is to provide a new and improved apparatus for automatically applying sleeves to articles.

Another object of this invention is to provide apparatus which can automatically cut sleeving to the proper length, place it on the resistor or the like to be covered, and form both ends of the sleeving.

A further object of this invention is to provide a novel apparatus for automatically sleeving resistors and the like which produces sleeved resistors at a high production rate which turns out a uniform product having smoothly tapered ends, and which produces a product having uniform strength characteristics.

The invention, in general, provides a sleeving apparatus having feeding means for introducing articles to be sleeved to the machine, orienting means for repositioning the articles, carrier means for moving the articles through a series of stations where the sleeving operation is performed, including a cutting station having means to extend and cut the sleeving material to a predetermined length each time an article is presented there, a forming station having means to form the sleeving to the article, and an extracting station having means for removing the article from the moving means. Also provided are drive means and transmission means, driven by said drive means, for driving the orienting and carrier means and for driving the cutting, forming, and extracting stations in timed relation to each other. A clutch couples said drive means to said transmission means, and a brake is connected with the transmission end of said clutch for stopping said transmission means.

In preferred embodiments, the invention includes means responsive to the position of the carrier means for disengaging said clutch and applying said brake, means responsive to the accumulation of a predetermined supply of articles to be sleeved from the feeding means for stopping their further introduction into the machine, means responsive to the absence of an article to be sleeved for preventing operation of the cutting station, timing means, operated at the extracting station, for disengaging the clutch, applying the brake and operating the forming station at predetermined times for a predetermined period of time, means driven by the transmission means for periodically operating the cutting station, and means responsive to the failure of an article to be removed by the extracting station for disengaging the clutch and engaging the brake.

Other objects, features, and advantages will appear from the following description of a preferred embodiment of the invention, taken together with the attached drawings thereof, in which:

FIG. 6 is an enlarged cut-away view showing resistors entering the second station from the first station;

FIG. 7 is an enlarged sectional view of the forming portion of the second station, and of the index table immediately after the forming of a sleeve about a resistor; and FIG. 8 is a schematic of the control circuit used in the sleeving machine.

Figure 1:
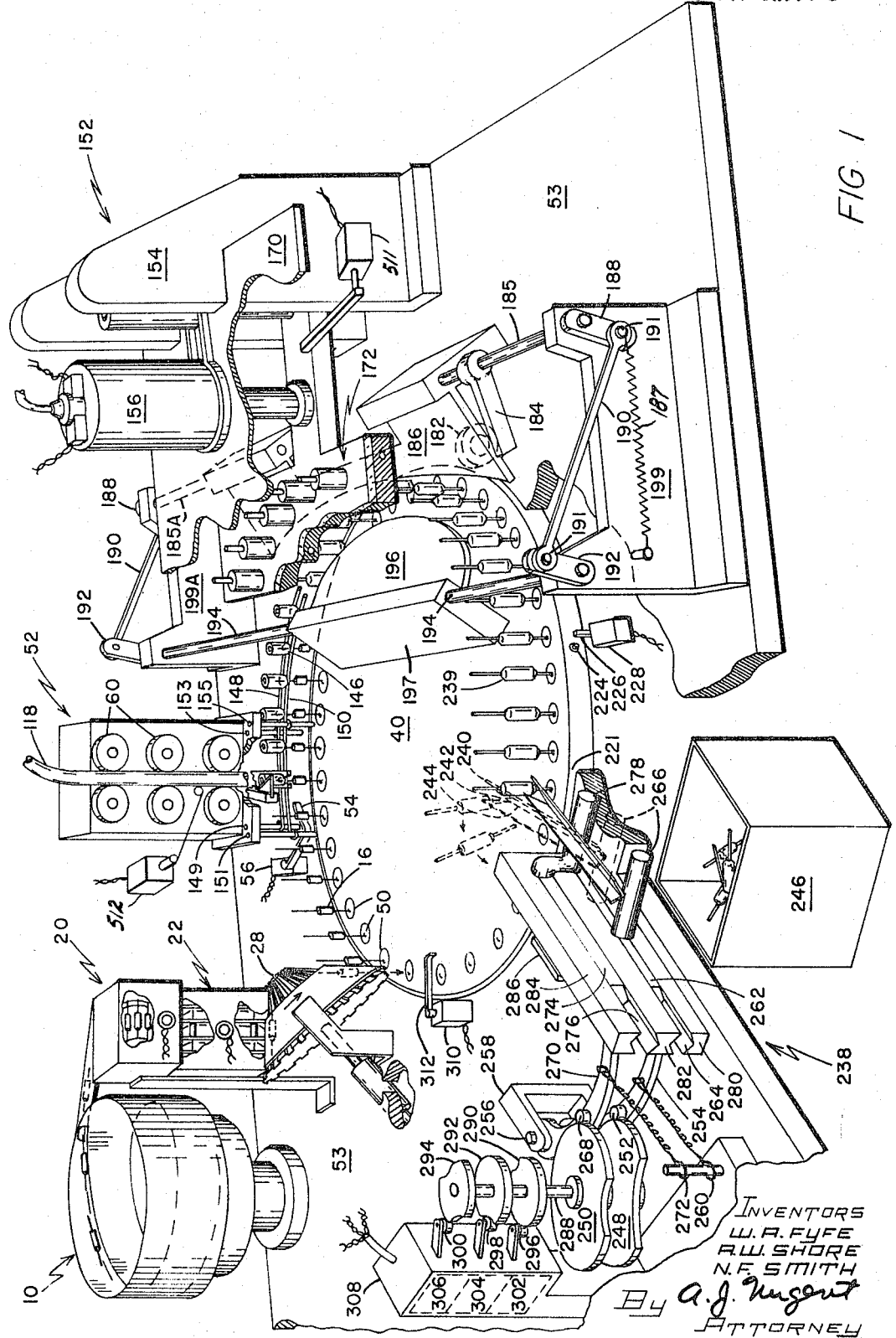
FIG. 1 is a perspective view of the sleeving machine of this invention.
Figures 3, 4:
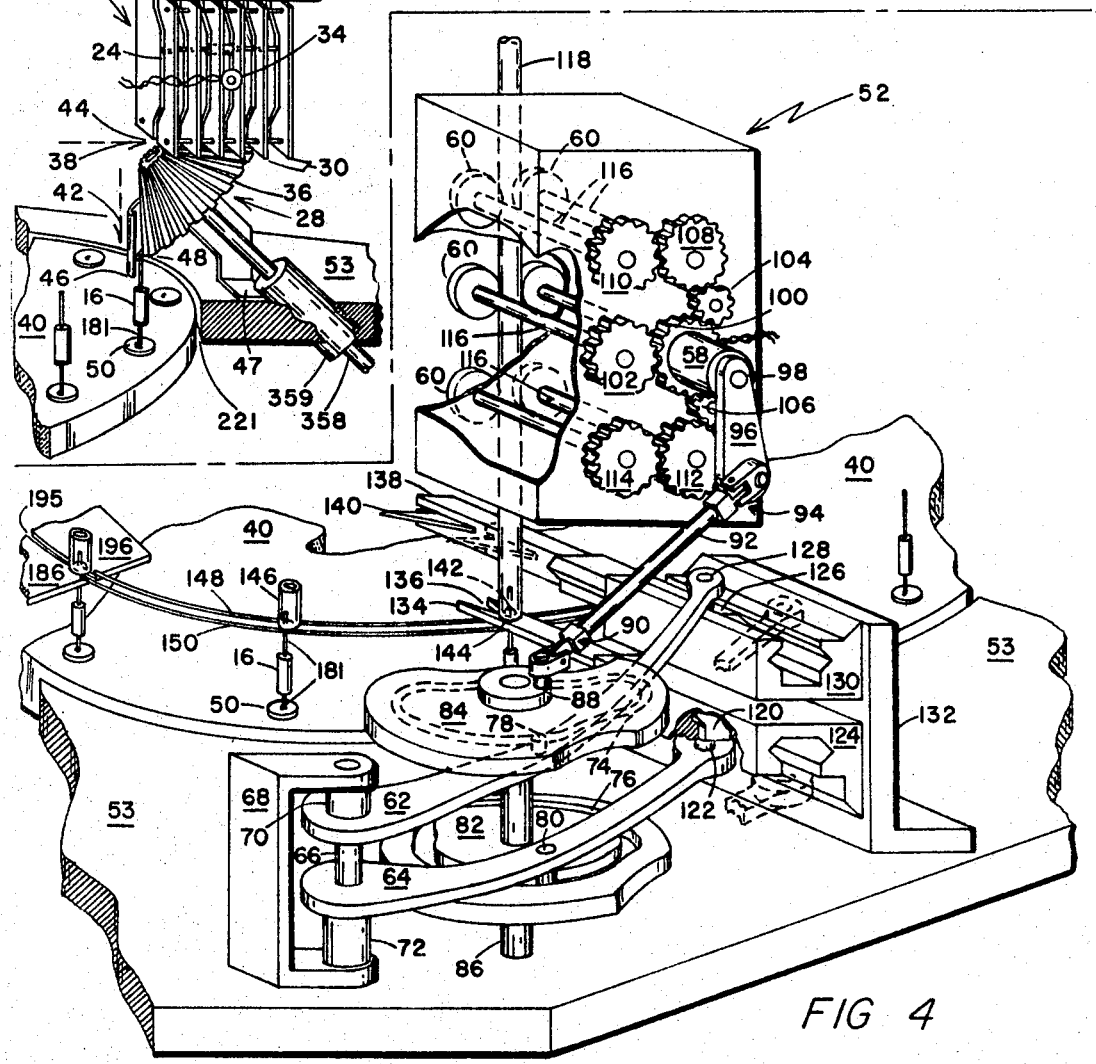
FIG. 3 is a detailed drawing of the orienting cone viewed from the left rear of FIG. 1.
FIG. 4 is an enlarged partially cut-away drawing of the first station viewed from the right rear in FIG. 1.

There is shown in FIGS. 1 and 3 a feeder 10 having a spiral ramp 12 on the inside of wall 14. Feeder 10 is vibrated at a frequency of approximately 60 cycles per second causing resistors 16 to progress gradually up the ramp 12 to chute 18 where they slide to lead straightener 20 by gravity. Within lead straightener 20 resistors 16 are rolled on the inner surface of a stationary drum so that the leads are pinched and rolled between them. The resistor body travels in a recess between the drums so that it is not in contact with the straightening surfaces. At the completion of the straightening operation the resistors are deposited in a riffle track 22. This is the last of the feeding mechanisms which introduce the resistors to the machine. The angled channel 24 in riffle track 22 serves to arrest the fall of the resistors as they drop to cone 28. The angled channel 24 is formed by identical paths in each of spaced sections 30.

As shown in FIG. 3, a photo-electric sensor 32 housed in lead straightener 20 causes feeder 10 to be de-energized if the resistors accumulate in straightener 20 and interfere with the light path. A similar photo-electric sensor 34 set in riffle track 22 causes lead straightener 20 to be de-energized if the resistors accumulate in riffle track 22 and interfere with that light path.

Cone 28 is frusto-conical in shape and has twenty-four grooves 36 equally spaced about its surface. It is a 90° cone and rotates about an axis inclined at 45° to the horizontal. Thus, the portion of cone 28 passing under riffle track 22 is in a horizontal position 38 and the portion immediately above index table 40 is in a vertical position 42. Resistors are taken from riffle track 22 in a horizontal position and are reoriented to a vertical position. The clearance 44 between cone 28 and riffle track 22 is less than the thickness of a resistor lead.

Figure 2:
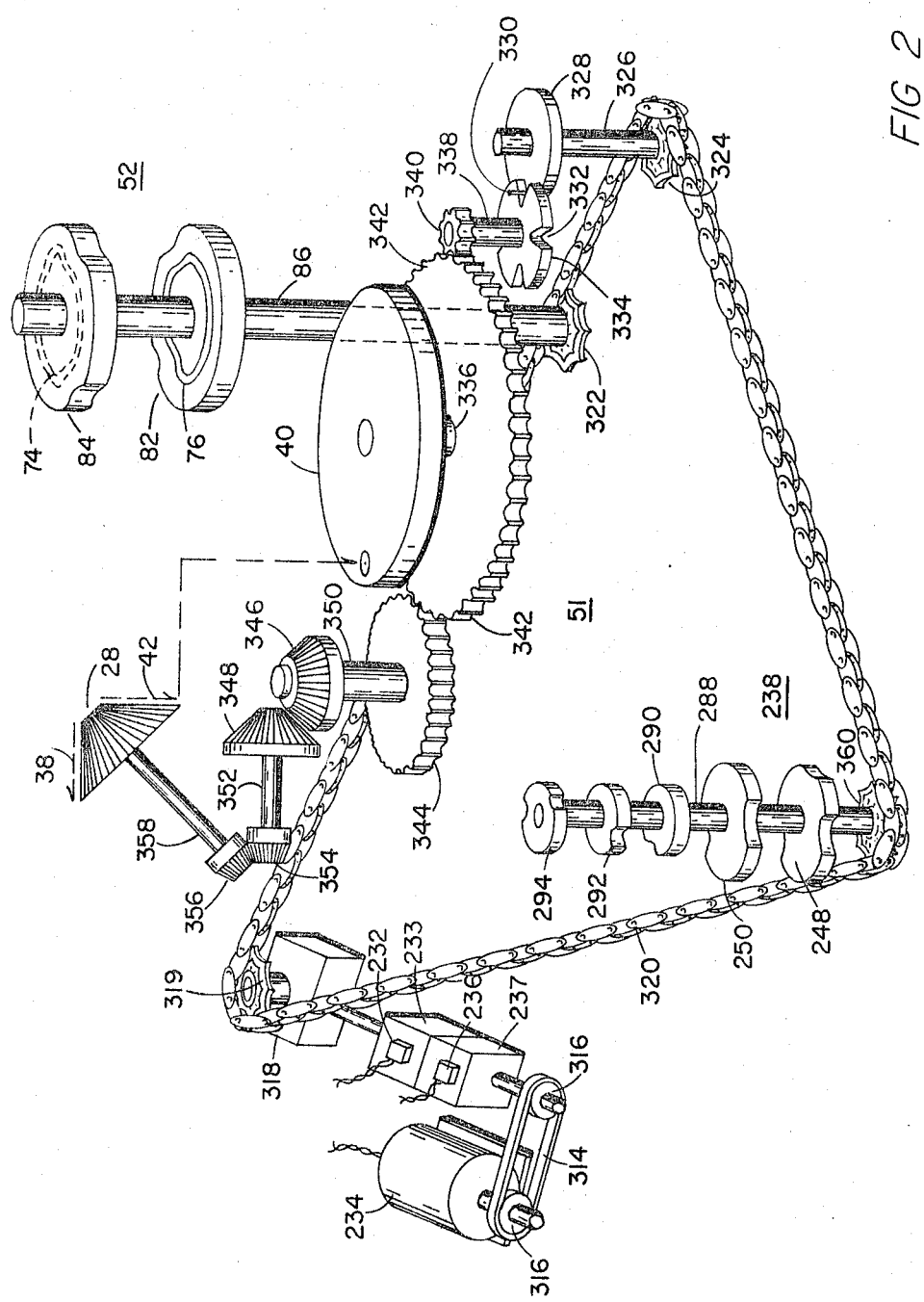
FIG. 2 is a perspective view in partial schematic of the transmission which drives the machine in FIG. 1.

Viewed from the top in FIG. 3, cone 28 is rotating in a counter-clockwise direction. Guard 46 extends from the bottom edge 48 of cone 28 to about midway up the surface and in a semicircle extending in the counter-clockwise direction from the bottom of riffle track 22 to the vertical position 42 above index table 40. Guard 46, supported by bracket 47, serves to retain the resistors in their respective grooves 36 as they are transported to the dies 50 in index table 40. Cone 28 is timed with index table 40 so that a resistor 16 reaches vertical position 42 when a die 50 is immediately beneath it. A Geneva-drive assembly in the transmission 51 of the machine imparts a stepping motion to index table 40 and cone 28; a dwell is made each time table 40 is moved to place a die 50 in position under cone 28. Transmission 51, FIG. 2, is beneath deck 53 of the machine. The apparatus shown in FIG. 1 is mounted directly on or by brackets, to deck 53.

Index table 40 has thirty-six dies 50 evenly spaced about its edge; viewed from the top it moves in a clockwise direction carrying resistors 16 to cutting station 52 one at a time in the stepping manner referred to, supra. As resistors 16 come to cutting station 52 they engage arm 54 of resistor sensor switch 56. Should there be no resistor in a die 50, arm 54 would not be engaged, thus switch 56 would not be actuated. A failure to actuate switch 56 prevents engagement of electrically controlled clutch 58, FIG. 4, and so sleeving drive wheels 60 are not rotated.

Levers 62 and 64, rotatable about shouldered shaft 66 and spaced from support bracket 68 by hubs 70 and 72, engage internal cam surfaces 74 and 76, respectively, by means of followers 78 and 80, respectively. Camming disks 82 and 84 are driven by shaft 86. The circular motion of shaft 86 is converted to oscillatory, linear motion by the combination of pin 88, swivel 90, rod 92 and swivel 94. Once each revolution of shaft 86, crank 96 is driven to the right, FIG. 4, and drawn back to the left. Crank 96 drives shaft 98 and gear 100 through clutch 58, clutch 58 engages while crank 96 is driven to the right but not while it is drawn to the left. Gear 100 drives gear 102, gear 104, and gear 106 directly. But gear 104 drives gear 108 which drives gear 110; and gear 106 drives gear 112 which drives gear 114. Gears 104 and 106 are idler gears that reverse the direction of rotation so that gears 108, and 112 rotate counter-clockwise as does gear 100. A separate shaft 116 is connected to each gear 100, 102, 108, 110, 112 and 114 and rotates with it. On the other ends of shafts 116 are connected drive wheels 60 which move sleeving 118 downward a prescribed amount each time clutch 58 is engaged. Sleeving 118 is supplied in bulk on a drum or roller and is drawn as needed by wheels 60.

Lever 64 pivoted to slide 120 at pin 122 drives slide 120 forward and back in channel 124; lever 62 pivoted to slide 126 at pin 128 drives slide 126 forward and back in channel 130. Channels 124 and 130 are mounted on bracket 132. Slide 120 has a stop arm 134 at its forward end, which contains a recess 136 for engaging the top lead of a resistor to be sleeved. Sleeving 118 is driven down until it meets stop arm 134 at which point further action of drive wheels 60 will be lost on sleeving 118 by the slipping of wheels 60. At the forward end of slide 126 is cutting arm 138 carrying blade 140. Arm 138 and blade 140 are at rest in the position shown and are drawn back to the position shown in dotted lines to cut sleeving 118. The timed relationship between cam surface 74, cam surface 76 and clutch 58 causes operation in the following sequence: stop arm 134 is moved forward, bringing the apex 142 of recess 136 into contact with the resistor lead; clutch 58 engages and drives sleeving 118 downward until the lower end 144 meets stop arm 134; clutch 58 is disengaged; stop arm 134 is drawn back; cutting arm 138 is drawn back cutting sleeving 118 with blade 140; and cutting arm 138 then moves forward again. After it is severed, sleeve 146 drops down, guided by the lead of the resistor, until it encounters guide wires 148, 150 which hold it on the resistor lead but above the resistor body. Guide wires 148, 150 are supported by pins 149, 151, 153, and 155 (FIG. 1) in front of station 52. The resistors, with their sleeves suspended above them on guide wires 148, 150, are carried to forming station 152 by index table 40.

Main bracket 154 (FIG. 5) supports air pressure cylinder 156 by means of bracket 158. Air pressure supplied through hose 160 enters cylinder 156 via coupling 162 through solenoid actuated valves 164, 166. Valve 164 enters air pressure into a chamber to drive piston 168 out of cylinder 156 while valve 166 enters pressure into another chamber to drive piston 168 into cylinder 156. An exhaust valve comprising portions 164 and 166 removes back pressure from the chamber that is not being pressurized. Piston 168 passes through ejection plate 170 and is fastened to mounting block 171 on forming plate 172. Guide rod 174 slides in cylinder 174a and is fastened to the rear portion of forming plate 172 so that it aligns forming plate 172 as it moves up and down. Forming plate 172 contains nine dies 176, FIG. 7, on its lower face 178 spaced to correspond with dies 50 on index table 40. Each die 176 cooperates with a tube 180 which receives the upper lead of the resistor as forming plate 172 is lowered over the resistor. Dies 50 and 176, FIG. 7, are identical in shape, but inverted in position. They are cylindrical with a conical recess in one end defined by tapered wall 177. The taper is determined by the size of the resistor, thickness of sleeving and desired appearance. In this embodiment the taper is approximately 45°. A hole 179 through the apex of the conical recess permits resistor lead 181 to pass through dies 50, 176 into tubes 216 and 180, respectively.

Figure 5:
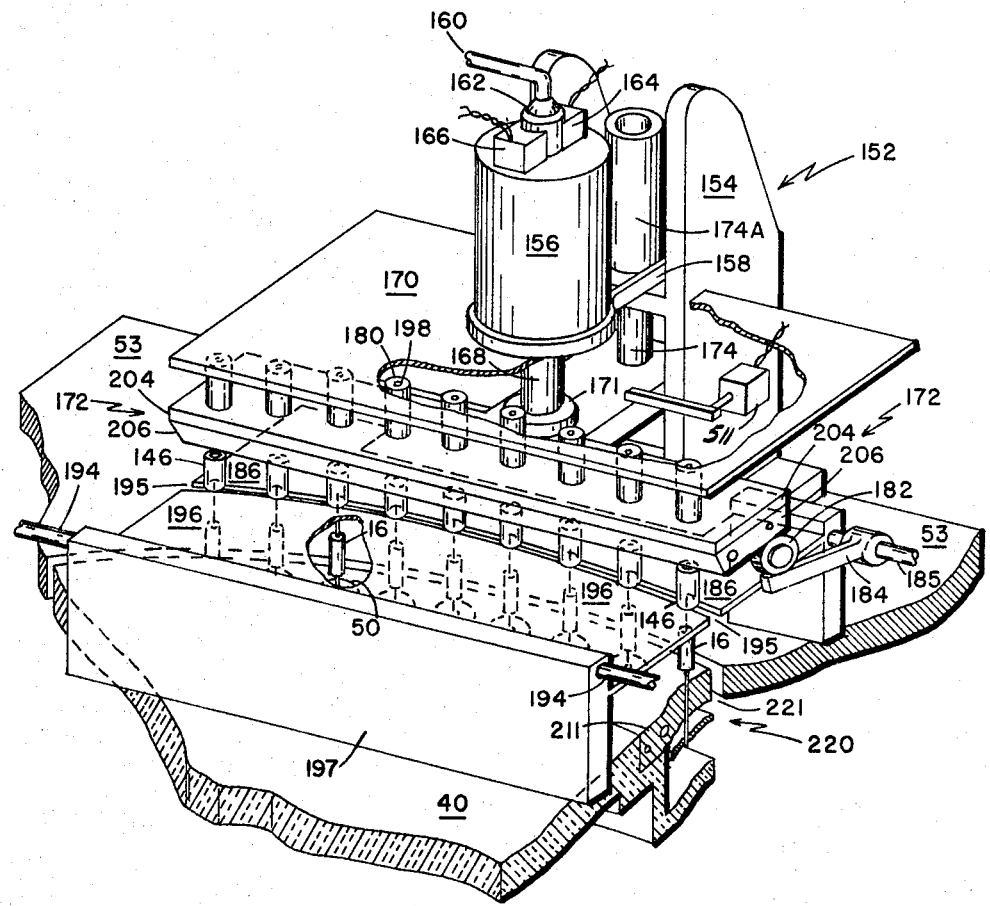
FIG. 5 is a detailed drawing of the second station, between forming operations, viewed from just forward of the center of the index table in FIG. 1.

When forming plate 172 is lowered, wheel 182 on its lower rearward edge engages arm 184 rotating shafts 185 and 185a counter-clockwise and moving guide plate 186 downward and to the right against the force of spring 187, FIGS. 1 and 5. Crank 188 moves with shaft 185 drawing rod 190 to the right and rotating crank 192, shaft 194, and guide plate 196 clockwise against the force of counterbalance section 197. Rod 190 is connected to cranks 188 and 192 by pins 191. An arcuate channel 195 formed by the adjacent edges of guide plates 186 and 196, supports sleeves 146 until the action of wheel 182 drives them apart. Guide plates 186 and 196 are attached to shafts 185 and 194, respectively. Shafts 185 and 194 are supported by brackets 199 and 199a. When valve 164 is closed and valve 166 is opened, the piston 168 is driven upward and plungers 198, biased downwardly by the force of springs 502 on flanges 201, contact lower surface 202, of bumper plate 170 dislodging any resistors which have become jammed in dies 176 or tubes 180.

Forming plate 172 consists of an insulating section 204 and heat transfer section 206, FIG. 7. A thermostat 208 maintains a temperature of about 350° F. in the area of dies 176 by controlling heater 210. Similarly, thermostat 212 and heater 214 maintain a temperature of about 350° F. in heat transfer section 211 in index table 40. Since all dies 50 are heated, tubes 216 are sized to keep the lower ends of the resistor bodies and their sleeves 146 from contacting dies 50. As forming plate 172 is lowered, push rod 218 pushes push rod 500 which lowers ejector section 220 against adjustable stop screw 501 which positions resistor 16 at the proper location for forming. Forming plate 172 continues downward with top resistor lead 181 pushing plunger 198 against spring 502 which is against tube 180 which holds resistor 16 in forming position down against ejector section 220. Push rod 218 is pushed up against spring 503. When forming plate 172 is raised spring 222 in recess 223 in index table 40 forces ejector section 220 upward against the bottoms of tubes 216. When the forming operation is over and push rod 218 is lifted, spring 222 moves the sleeved resistor up with sufficient force to dislodge those which may be stuck in dies 50.

The thirty-six dies 50 on index table 40 are assembled in four groups, each group of nine dies 50 uses a separate ejector section 220. Between each group, on the side of index table 40, as a detent 224, which contacts arm 226 of actuating switch 228 signifying that a group of nine resistors is beneath forming plate 172 ready for the forming operation. The signal from switch 228 energizes a timer 230, FIG. 8, which opens valve 164 for a predetermined period of time, then closes valve 164 and opens valve 166. Timer 230 also energizes normally de-energized brake control 232, FIG. 2, applying brake 233 and de-energizes normally energized clutch control 236, de-energizing clutch 237. This disengages clutch 237, which couples motor 234 to transmission 51, until forming plate 172 is retracted.

The force exerted by dies 50 and 176 at approximately 350° F. collapses the ends 231 of sleeves 146 about the ends of resistors 16 in substantial conformity with tapered walls 177.

The sleeved resistors 239 move to extracting station 238, FIG. 1, where extractor arm 240 slides under the resistor body receiving the lower lead in longitudinal slot 242. After forward movement, the front extractor arm 240 is moved upwardly to lift sleeved resistor 239 from die 50. Sleeved resistor 239 falls into trough 244 and slides into a suitable receptacle 246.

The forward and backward motion and the up and down motion of extractor arm 240 are directed by two separate cams 248 and 250, respectively. Cam 248 drives follower 252 attached to lever 254. Lever 254, pivoted on shaft 256, in bracket 258, is biased toward cam 248 by spring 260. The action of cam 248 drives slide 262 to and fro on channel 264; pin 266 rotatably mounted in slide 262 extends through the right side of channel 264 to support the rear section of extractor arm 240. Similarly, cam 250 drives follower 268 on lever 270 and lever 270 pivoted on shaft 256 is biased toward cam 250 by spring 272. The action of cam 250 drives slide 274 to and fro in channel 276; and angled pin 278, rotatably mounted in slide 274, supports the front section of extractor arm 240. Channels 264 and 276 are formed by sections 280, 282, and 284 as positioned by support 286. The action of extractor arm 240 results from the relationship between cams 248 and 250. Pins 266 and 278 are moved forward uniformly for a period, then pin 266 is moved at a rate faster than that of pin 278. The forward motion of pin 266 relative to pin 278 rotates extractor arm 240 elevating its front section.

Shaft 288, driven by transmission 51, drives cams 248 and 250 and cams 290, 292, and 294. Each cam 290, 292, and 294 engages an actuator 296, 298, and 300 respectively which operates switches 302, 304, and 306 respectively; the switches are in housing 308. The function of switches 302, 304, and 306 will be explained in relation to FIG. 8.

Switch 310 having a sensing arm 312 is disposed between extractor station 238 and cone 28 to arrest operations if extractor arm 240 fails to remove a resistor. Further explanation of this function is set forth in relation to FIG. 8.

Transmission 51, FIG. 2, beneath deck 53 is coupled to electric motor 234 by clutch 237; motor 234 drives clutch 237 by means of belt 314 and pulleys 316. By a simultaneous releasing of the clutch 237 and engaging of brake 233, transmission 51 may be effectively instantaneously stopped. The output from clutch 237 drives a gear reducer 318; the output of gear reducer 318 on sprocket 319 drives chain 320. Chain 320 moves in a clockwise direction, FIG. 2, driving sprocket 322, which is attached to shaft 86, and supplying power to camming disks 82 and 84. Sprocket 324 drives shaft 326 which carries a Geneva-drive input gear 328. Geneva-drive input gear 328 has one pin 330 spaced about its outer edge. The Geneva-drive results from the meshing of pin 330 with corresponding slots 332 in Geneva-drive output gear 334. While gear 328 rotates uniformly and at a constant speed, power is transmitted to gear 334 intermittently because pin 330 moves inwardly and outwardly in slots 332 for a part of its travel and is then ineffectual to rotate gear 334. The intermittent drive is transmitted to index table 40, mounted on shaft 336, through shaft 338 and conventional gears 340 and 342. Cone 28 is timed with index table 40 by receiving the intermittent drive of gear 342 through gear 344, then through bevel gears 346 and 348 on shafts 350 and 352, respectively; then through bevel gear 354, also on shaft 352, and finally through bevel gear 356 on shaft 358 which carries cone 28. Shaft 358 is supported in bearing 359 mounted in deck 53. The combination formed by gears 346, 348, 354, and 356 is commonly known as a mitre mechanism. The final sprocket 360 in transmission 51 connects with shaft 288 to drive cams 248, 250, 290, 292, and 294.

The wires shown attached to the switches and equipment in the drawings indicate that there are electrical connections to these components. A block diagram of an electrical circuit for controlling and coordinating the operation of the sleeving machine is shown in FIG. 8. Bus 362 is energized under the control of ON-OFF switch 366 and run switch 378 connected to a conventional A.C. source. With bus 362 energized, one input at each AND circuit 368, 370, and 372 is energized. An AND circuit is one which must have all its inputs energized to deliver a signal at its output. Thus, an AND circuit having inputs W, X, and Y and output Z must simultaneously receive signals at W *and* X *and* Y to deliver an output at Z. An OR circuit will have an output if any combination of its inputs is energized. AND and OR circuits are common circuits and are shown, for example, in "Arithmetic Operations in Digital Computers" by R. K. Richards, D. Van Nostrand Company, Inc., 1956.

A signal on line 380, indicating that there is not a sufficient accumulation of resistors, at a time when bus 362 is energized, causes an output from AND circuit 368 to be supplied to vibrator supply 10. This starts resistors 16 moving to lead straightener 20. If resistors 16 accumulate above a predetermined level in lead straightener 20, they interfere with the light path of photo-electric sensor 32 and cut off the signal on line 380. As a result vibrator supply 10 is de-energized until the level of the resistors in lead straightener 20 decreases. The power to energize lead straightener 20 is likewise controlled by AND circuit 370 and photo-electric sensor 34 over line 382. Photo-electric sensor 34 monitors the level of resistors in riffle track 22. AND circuit 372 energizes clutch 58 when bus 362 is energized, *and* resistor sensor 56 delivers a signal on line 384, indicating a resistor is in position, *and* cam 292 engages actuator 298 closing sleeve clutch switch 304. Cam 292 is designed to close sleeve clutch switch 304 each time index table 40 carries a resistor to sleeving station 52. The operation of index table 40 and cam 292 is coordinated because shafts 288 and Geneva-drive gear 328 and sprocket 324 are both driven by chain 320. Heat on switch 513 provides an input to AND circuits 374 and 376.

Heater 214 in index table 40 is controlled by thermostat 212 through AND circuit 376. Similarly, heater 210 in heat transfer section 206 is controlled by thermostat 208 through AND circuit 374.

An input to OR circuit 388 on line 390 or on line 392 causes an output on line 394 energizing brake control 232 and de-energizing clutch control 236. Line 390 is energized by cyclic stop switch 302 when forming timer 230 is operating, forming timer 230 is started by an output from AND circuit 396. AND circuit 396 provides an output when arm 226 of indexing switch 228 is actuated by a detent 224 indicating that nine dies 50 are in position for the forming operation and cam 294 closes forming timer switch 306 by engaging actuator 300. Forming timer 230 closes valve 166 and opens valve 164 driving piston 168 downward at the same time that it supplies a signal to AND circuit 510. At the end of the cycle of forming timer 230, approximately 15 seconds, valve 166 is opened and valve 164 is closed driving piston 168 upward. Brake control 232 is de-energized, releasing brake 233, and clutch control 236 is energized, engaging clutch 237 when driving piston 168 reaches its top position closing switch 511.

Either STOP switch 398 or extractor failure switch 310 or no sleeving switch 512, or forming plate up switch 511 can disconnect motor 234 from transmission 51 by energizing brake control 232 and de-energizing clutch control 236 through OR circuit 400. Including a second input to AND circuit 402 from cyclic stop switch 302 permits the disconnection of motor 234 from transmission 51 at a definite time in the operation. This prevents stopping when a resistor is in the process of receiving a sleeve 146 at cutting station 52 or when nine resistors are undergoing the forming process at forming station 152.

The operation of the machine may be better understood by an example tracing the movement of a single resistor with heaters 210 and 214 at operating temperature. ON-OFF switch 366 is depressed energizing motor 234 and brake control 232. RUN switch 378 is depressed energizing the system, energizing clutch 237 and de-energizing brake 233. Chain 320, driven by gear reducer 318 through sprocket 319, and sprockets 322, 324, and 360 are now in motion. Thus cam disks 82 and 84 are rotating and driving sleeving station 52; index table 40 and cone 28 are moving with an intermittent motion; cams 248 and 250 are rotating, driving extractor arm 240; and cams 290, 292, and 294 are rotating and cycling switches 302, 304, and 306, respectively.

With the beginning of vibrations in vibrator supply 10, the resistor moves up spiral ramp 12 to chute 18. It then slides down chute 18 into lead straightener 20 and from there to riffle track 22. A groove 36 of cone 28 in horizontal position 38 receives the resistor from riffle track 22 during a dwell in the intermittent motion and moves counter-clockwise within guard 46 depositing the resistor in an aligned die 50 in index table 40 as groove 36 reaches vertical position 42.

As the resistor is carried clockwise by index table 40 it next encounters arm 54, of switch 56 which provides one of two signals necessary to feed sleeving 118; the other signal comes from sleeve clutch switch 304. Tubing 118 is moved down by drive wheels 60 until it meets stop arm 134, then drive wheels 60 are stopped, stop arm 134 is withdrawn and cutting arm 138 is drawn in cutting sleeve 146. Sleeve 146 falls over the upper lead of the resistor to rest above the body of the resistor on guide wires 148 and 150. The resistor continues moving, its upper lead passing from between guide wires 148 and 150 into channel 195; sleeve 146 is now supported by the edges of guide plates 186 and 196. When there are nine resistors at forming station 152 in nine dies 50 corresponding to an ejection section 220, switch 228 is actuated by detent 224; now a signal from switch 306 starts forming timer 230. Forming timer 230 energizes brake control 232 and clutch control 236 disconnecting motor 234 from transmission 51 when stop switch 302 is actuated. Valve 164 is opened, by forming timer 230, piston 168 and forming plate 172 are driven downward making wheel 182 bear on arm 184. This moves guide plates 186 and 196 downwardly and apart from each other causing nine sleeves 146 to drop about their respective resistors. The downward movement continues, compressing sleeves 146 to the resistors with dies 50 and 176, and driving ejection section 220 away from tubes 216 by means of push rod 218. After approximately 15 seconds forming timer 230 closes valve 164 and opens valve 166 driving piston 168 back into cylinder 156. Push rod 218 now withdraws from ejector section 220 raising the sleeved resistors 239 in tubes 216. Guide plates 186 and 196 move to their normal, horizontal position as forming plate 172 moves upward actuating former plate up switch 511.

When former switch 511 is actuated brake control 232 is de-energized and clutch control 236 is energized setting transmission 51 in motion. Extractor arm 240 moves forward and under each sleeved resistor 239, then lifts the resistor from its die 50 spilling it into trough 244; the resistor then slides into receptacle 246.

Other embodiments will occur to those skilled in the art and are within the following claims.

What is claimed is:
1. Sleeving apparatus comprising:
   feeding means for introducing objects to be sleeved to said apparatus,
   orienting means for moving said objects from a first posture to a second posture,
   carrier means for individually receiving said objects from said orienting means and continuously moving them through stations of said apparatus,
   said stations including a cutting station for extending sleeving and cutting a predetermined length of said sleeving,
   a forming station for receiving said object with said predetermined length of sleeving and conforming both ends of said predetermined length of sleeving to said object, and
   an extracting station for removing the sleeved object from said carrier means,
   means between said cutting and forming stations, including a retractable segment at the latter station, for supporting a cut sleeving in provisional mounted relationship over individual ones of said objects as the latter travel from said cutting station to said forming station, said forming station including means for retracting said supporting means thereat after which the cut sleeving is mounted over its respective object and is conformed thereto,
   transmission means for driving said carrier means, said orienting means, said cutting station, said forming station, and said extractor station in timed relation,
   drive means for actuating said transmission means, and
   coupling means, responsive to conditions at said forming station and at said extractor station, for connecting said drive means to said transmission means.

2. The apparatus of claim 1 in which said means for orienting includes a rotatable conical member having one section of its surface always proximate to said feeding means and a second section of said surface proximate to said carrier means.

3. The apparatus of claim 1 in which said carrier means includes:
   a movable table,
   a plurality of dies, equi-distantly spaced on said table and shaped for receiving said objects, individually, from said orienting means,
   said dies being in groups defined by indicia disposed on said movable table, and
   a remote sensor for sensing said indicia.

4. The apparatus of claim 3 in which said table is circular and is rotatably mounted, said indicia are detents, and said sensor is a switch actuatable by said detents.

5. The apparatus of claim 3 in which said table further includes:
   an ejection section associated with each said defined group of said dies, said ejection section being normally in a first position in which said objects are kept from fully seating in said dies, and being displaceable at said forming station to a second position to allow said objects to fully seat for a predetermined time, said objects being unseated when said ejection section returns to said first position.

6. The apparatus of claim 1 in which said cutting station includes:
extending means for moving sleeving,
limiting means for controlling the amount of said sleeving extended,
cutting means for severing a predetermined length of said sleeving extended,
said supporting means including a pair of spaced members through which portions of the objects extend, the cut sleevings are provisionally mounted over such portions and slidably travel along said members without contacting said carrier means during travel of the objects to the forming station, and
a common drive element for driving said extending means, said limiting means, and said cutting means.

7. Apparatus for sleeving objects comprising:
means for introducing objects to be sleeved to said apparatus,
carrier means having first forming means for individually receiving said objects and moving them through stations of said apparatus,
said stations including a cutting station for extending sleeving and for cutting same to a predetermined length,
a forming station for receiving said objects each with a predetermined length of precut sleeving and, in cooperation with said first forming means, for conforming both ends of said sleeving to said object, and
an extracting station for removing the sleeved object from said carrier means,
transmission means for driving said introducing means, said carrier means, said cutting station, said forming station, and said extractor station in timed relationship,
means responsive to the conditions at said forming station and at said extractor station for actuating and deactuating said transmission means,
guide means along the path of travel of the objects between said cutting station and said forming station for supporting cut sleeving in provisional mounted relationship on individual ones of the objects and temporarily maintaining such sleevings from contact with said carrier means, said guide means including removable means at said forming station,
said forming station also including second forming means for accepting the ends of said objects, compressing the corresponding ends of said predetermined lengths of sleeving to said objects and pressing said objects against said first forming means of said carrier means as said second forming means moves from a first position to a second position,
motive means for driving said second forming means,
actuator means for selectively actuating said motive means to drive said second forming means from one of said first or second positions to the other,
deflecting means for removing said removable guide means and allowing said predetermined lengths of sleeving to slide down said objects to be sleeved as said second forming means moves from said first position to said second position, and for maintaining said removable guide means so removed while said second forming means is in said second position,
ejecting means for expelling any said object which becomes jammed in said second forming means, and
displacing means, connected to said second forming means, for shifting an ejection section in said carrier means to allow said objects to seat in said first forming means when said second forming means comes into said second position.

8. The apparatus of claim 7 in which said removable guide means includes:
a first rotatable support plate,
a second rotatable support plate in the same plane as, and spaced from, said first support plate, said support plates being spaced to make a path between said plates to accept said objects and support their respective lengths of sleeving,
linkage means connecting said first support plate with said second support plate for rotating said second support plate in the opposite direction of said first support plate as said deflecting means rotates said first support plate.

9. The apparatus of claim 8 in which said deflecting means includes:
a drive wheel connected to said second forming means,
a follower arm, connected to said first support plate, for engaging said drive wheel as said second forming means moves toward said second position, and while said second forming means is in said second position.

10. The apparatus of claim 7 in which said ejecting means includes:
a plurality of hollow tubes mounted in, and rising above, said second forming means, each said tube having one end shaped for receiving the ends of said objects,
a spring housed in each of said tubes,
a plunger normally, partially housed within the other end of said tubes and being biased toward said one end by said spring, and
a bumper plate spaced from said second forming means a distance greater than the height of said tubes but less than the height of said tubes plus said plungers in the extended position,
said plungers being driven toward said one end of said tubes as said second forming means moves to said first position expelling any of said objects that are jammed in said tubes or in said second forming means.

11. The apparatus of claim 7 in which said displacing means includes:
a push-rod connected to said second forming means,
said ejection section being mounted beneath a portion of said carrier means in supporting relation with said objects that are being moved by said carrier, and
a spring, mounted in said carrier means for biasing said ejection section toward said second forming means,
said push-rod bearing on said ejection section and shifting said ejection section away from said second forming means against the force of said spring as said second forming means moves to its second position.

12. The apparatus of claim 1 in which said transmission means includes:
a drive mechanism connected to the output of said motive coupling means,
a common drive element, driven by said drive mechanism, and
a plurality of power take-off members, driven by said common drive element, for driving said stations and said orienting means in timed relation.

13. Apparatus in accordance with claim 1 wherein said carrier means has first conical shaped forming means for operatively cooperating with second conical forming means at said forming station for positioning a cut sleeving over an object and conforming the sleeving thereto, said supporting means preventing premature contact of said sleeving with said carrier forming means while said sleeving is provisionally mounted over said object.

14. Apparatus for plastic sleeving the bodies of resistors or like tubular articles having terminal leads at the opposite ends thereof comprising:
indexing carrier means having a plurality of first conical die molds for individually receiving the resistors and for moving said resistors through work stations along the apparatus,
feed means for loading said resistors upright on the carrier means with first ones of the resistor terminal leads extending into the carrier die molds, movable extractor means having a first positional status for engaging said first leads for holding the bodies of the resistors spaced above the carrier means and the die molds thereof without contacting same, said apparatus stations including, a cutting station for extending tubular sleeving and cutting same to given lengths for mounting over respective ones of said resistors, a forming station for receiving the resistors each with a cut sleeving and having second conical die molds cooperating with said first die molds for conforming both ends of the sleeving to its resistor, and an extracting station for removing the sleeved resistors from said apparatus, means for supporting the cut sleeving released by said cutting station in provisional mounted relationship over the second of said resistor terminal leads without contacting said carrier means as the resistors travel between the cutting and forming stations, said means including retractable members at the forming station, and said forming station including means for retracting said retractable members, for operatively closing said die molds, and for withdrawing said extractor means to a second positional status to permit the cut sleevings to position over the individual resistor bodies as the assembled combinations locate in said die molds for conforming the sleevings to said resistors.

15. Apparatus in accordance with claim 14 wherein said feed means including:

supply means for releasing resistors one at a time and with straightened terminal leads, and groove-surfaced rotatable conical means having a first section oriented along a first axis for receiving from said supply means resistors singly in the individual grooves and also having a second section oriented along a second axis for depositing the resistors upright in said carrier dies.

16. Apparatus in accordance with claim 14 wherein said supporting means including:

spaced members cooperating with said retractable members for forming a channel permitting the second of the resistor terminal leads to extend upright thereto, the cut sleevings mounted on said second leads move slidably along said members in spaced relationship above said carrier means to avoid premature contact with said carrier means as the resistors travel to the forming station.

17. Apparatus in accordance with claim 14, wherein said forming station also including a movable forming plate containing said second die molds, said retractable members being movable from a coplanar positional status between said forming plate and said carrier means to a retractable positional status to permit movement of said plate to close upon said carrier die molds, the coplanar positioned members form a channel through which the second resistor leads extend as the sleevings mounted thereon are slidably supported by said members and avoid contact with said plate upon resistor travel into the forming station, said forming station means including:

means linking said retractable members for moving same from one to the other of their respective positions, said plate having means engageable with said linking means for driving said retractable members to their retracted position upon movement of said plate in a direction to close said die molds, and means for actuating closing movement of said plate in response to indexing of said carrier means.

18. Apparatus in accordance with claim 14 wherein said forming station includes:

a forming plate movable to close against said carrier means and containing said second die molds and also push rods for engaging said second resistor leads, said push rods are biased in a direction to eject resistors from said second die molds, said carrier means supporting said movable extractor means to the rear of said carrier dies, and said extractor means being biased in a direction to eject resistors from said carrier dies, said dies having recesses rearwardly of the conical forming faces thereof for receiving the resistor leads and permitting respective engagement of the leads with said push rods and extractor means, said forming plate having a second push rod for operatively engaging and shifting the extractor means away from said carrier dies for forming said sleevings on the resistors, said extractor means is biased for return travel upon separation of said forming plate from said carrier dies.

References Cited

UNITED STATES PATENTS

| | | | |
|---|---|---|---|
| 2,282,328 | 5/1942 | Herrick et al. | 18—5 XR |
| 2,476,707 | 7/1949 | Danziger | 18—5 |
| 2,483,028 | 9/1949 | Waldinger | 18—20 XR |
| 2,504,751 | 4/1950 | Studti | 18—20 |
| 2,743,478 | 5/1956 | Harlow et al. | 18—2 XR |
| 2,798,255 | 7/1956 | Winters | 18—20 |
| 2,823,419 | 2/1958 | Winters et al. | 18—20 |
| 3,005,539 | 10/1961 | Wellington | 18—5 XR |
| 3,007,197 | 11/1961 | Grover. | |
| 3,012,273 | 12/1961 | Lewis | 18—5 XR |
| 3,058,150 | 10/1962 | Makowski | 18—20 XR |

WILLIAM J. STEPHENSON, *Primary Examiner.*